United States Patent
Lin

(10) Patent No.: US 8,419,233 B2
(45) Date of Patent: Apr. 16, 2013

(54) LAMPSHADE STRUCTURE FOR LED LAMPS

(75) Inventor: Ming Tsung Lin, Taipei (TW)

(73) Assignee: Applied Lighting Company, Sindian Dist, New Taipei (TW)

( * ) Notice: Subject to any disclaimer, the term of this patent is extended or adjusted under 35 U.S.C. 154(b) by 0 days.

(21) Appl. No.: 13/104,948

(22) Filed: May 10, 2011

(65) Prior Publication Data

US 2012/0287641 A1 Nov. 15, 2012

(51) Int. Cl.
*F21V 11/00* (2006.01)

(52) U.S. Cl.
USPC .............. 362/355; 362/311.06; 362/268

(58) Field of Classification Search .......... 362/268, 362/311.01, 311.02, 311.06, 311.09, 331–336, 362/355
See application file for complete search history.

(56) References Cited

U.S. PATENT DOCUMENTS

| | | | |
|---|---|---|---|
| 2002/0080482 A1* | 6/2002 | Watanabe et al. | 359/452 |
| 2008/0067531 A1* | 3/2008 | Chang | 257/98 |
| 2008/0165547 A1* | 7/2008 | Amor et al. | 362/373 |
| 2008/0165548 A1* | 7/2008 | Misawa et al. | 362/487 |
| 2008/0180967 A1* | 7/2008 | Totani et al. | 362/518 |
| 2010/0327302 A1* | 12/2010 | Wang et al. | 257/98 |

FOREIGN PATENT DOCUMENTS

CN 201661983 U 12/2010

* cited by examiner

*Primary Examiner* — Julie Shallenberger
(74) *Attorney, Agent, or Firm* — IPR Works, LLC

(57) ABSTRACT

A lampshade structure for LED lamps includes at least one light-diffusing bowl structure, a lower end, an interior space and a sidewall. The light-diffusing bowl structure composed by an exterior curve wall and an interior curve wall is located on top of the lampshade to diffuse lights from the LED laterally to the lamp. Both the curvature centers of the exterior curve wall and the interior curve wall are located exteriorly to the lampshade structure. By providing the concave light-diffusing bowl structure to occupy the illumination angle of the LED, the incident rays of the LED to the bowl structure can be partly deflected to leave from the lateral sides of the lampshade so as to emulate the LED lamp as an omni-directional lamp device.

14 Claims, 10 Drawing Sheets

LAMPSHADE STRUCTURE FOR LED LAMPS

BACKGROUND OF THE INVENTION (1) Field of the Invention

The invention relates to a lampshade structure for LED (light emitting diode) lamps, and more to the lampshade structure that provides a semi-reflection portion for redirecting part of the incident rays to other portion of the lampshade so as to transform the LED lamp into an omni-directional light bulb apparatus.

(2) Description of the Prior Art

In the art of the omni-directional illumination, the common incandescent lamp who provides an illumination pattern almost in all directions dominates the market for decades. Yet, the conventional incandescent lamp has an untouchable drawback in energy-consumption, and this is the problem that draws intensive concern in considering almost all electric and electronic apparatuses nowadays. Inevitably, the conventional incandescent lamps and light bulbs need to be replaced as soon as possible in all comprehensive illumination applications.

The development of light emitting diodes (LED) featured in power-saving and more environment-friendly seems to provide a resort to resolve the energy-consumption problem in the illumination industry. However, the limited illumination pattern of the LED still poses a viewing-angle problem for many lighting applications. Commonly, the viewing angles of the LEDs are limited to 30-120 degrees, but the intensity is reduced up to 50% at the extremes of each illumination pattern. Such a characteristic of the LED illumination hinders the possibility of a whole-scale replacement of the conventional incandescent lamps.

Nevertheless, there are still various ways to modify the illumination pattern of the LEDs. One of these methods is laid on the diffusion property of lights by using a frosted or diffraction-style lens, canopy or lampshade to cover the LEDs of the lamp. This method is successful to some degrees but may attenuate the total light to make darker of the lamp.

Another technique is to mount many LEDs to form a lighting pine cone in the lamp device for providing lights in all directions. Yet, such an approach is costly and difficult to manufacture, and also induces always a heat-dissipation problem which may be too big and expensive to be resolved. Definitely, in the development of using LEDs in omni-directional illumination, efforts to provide a less-expensive, sufficient illumination and less heat-accumulated LED lamp are surely and widely welcome to the world.

SUMMARY OF THE INVENTION

Accordingly, it is an object of the present invention to provide a lampshade structure for LED lamps, which includes at least a light-diffusing portion to deflect part of the incident rays of the LED or LEDs to leave from the lateral sides of the lampshade so as to emulate an omni-directional lamp device.

In the present invention, the lampshade structure for LED lamps comprising at least one light-diffusing bowl structure, a lower end, an interior space and a sidewall.

The light-diffusing bowl structure is located on top of the lampshade, and is composed by an exterior curve wall and an interior curve wall. The exterior curve wall has a curvature radius Re and a curvature center Ce, while the interior curve wall has a curvature radius Ri and a curvature center Ci. Importantly, both the Ce and the Ci are located exteriorly to the lampshade structure.

The lower end is open downward and is located oppositely to the diffusing bowl structure.

The interior space is to accommodate at least one LED close to the lower end.

The sidewall is to connect the light-diffusing bowl structure and the lower end in a manner of encircling the interior space and the LED thereinside.

In one embodiment of the present invention, the lampshade structure for LED lamps according to claim 1, the curvature center of the exterior curve wall Ce and the curvature center of the interior curve wall Ci are the same point.

In one embodiment of the present invention, the curvature radius of the interior curve wall Ri is larger than that of the exterior curve wall Re.

In one embodiment of the present invention, the light-diffusing bowl structure is made of a light-diffusing material.

In one embodiment of the present invention, the light-diffusing bowl structure is made of a light-permissible material containing light-diffusing powder, such as a silicone powder, a PMMA powder, or any the like.

In one embodiment of the present invention, the interior curve wall of the light-diffusing bowl structure is coated with a light-diffusing membrane.

In one embodiment of the present invention, the exterior curve wall of the light-diffusing bowl structure is coated with a light-diffusing membrane.

In one embodiment of the present invention, the sidewall of the lampshade further has a surface structure formed as a plurality of piling rings, and each of the piling rings has a semi-circle cross section.

In one embodiment of the present invention, the sidewall of the lampshade is formed as a frame structure.

According to the present invention, an LED lamp device can comprises a base for connecting with a foreign power source, an installation bowl constructed on top of the base, a transformer connected electrically with the base and mounted inside the installation bowl, a hollow post mounted on the installation bowl, a heat-dissipation module mounted on the installation bowl by accommodating the hollow post in a central portion thereof, a circuit board mounted in a central top portion of the heat-dissipation module and on top of the hollow post and being wired to the transformer through the hollow post, at least an LED mounted on the circuit board, a holder ring mounted on top of the heat-dissipation module, and the aforesaid lampshade mounted on top of the heat-dissipation module by the holder ring.

All these objects are achieved by the lampshade structure for LED lamps described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a lampshade structure for LED lamps. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
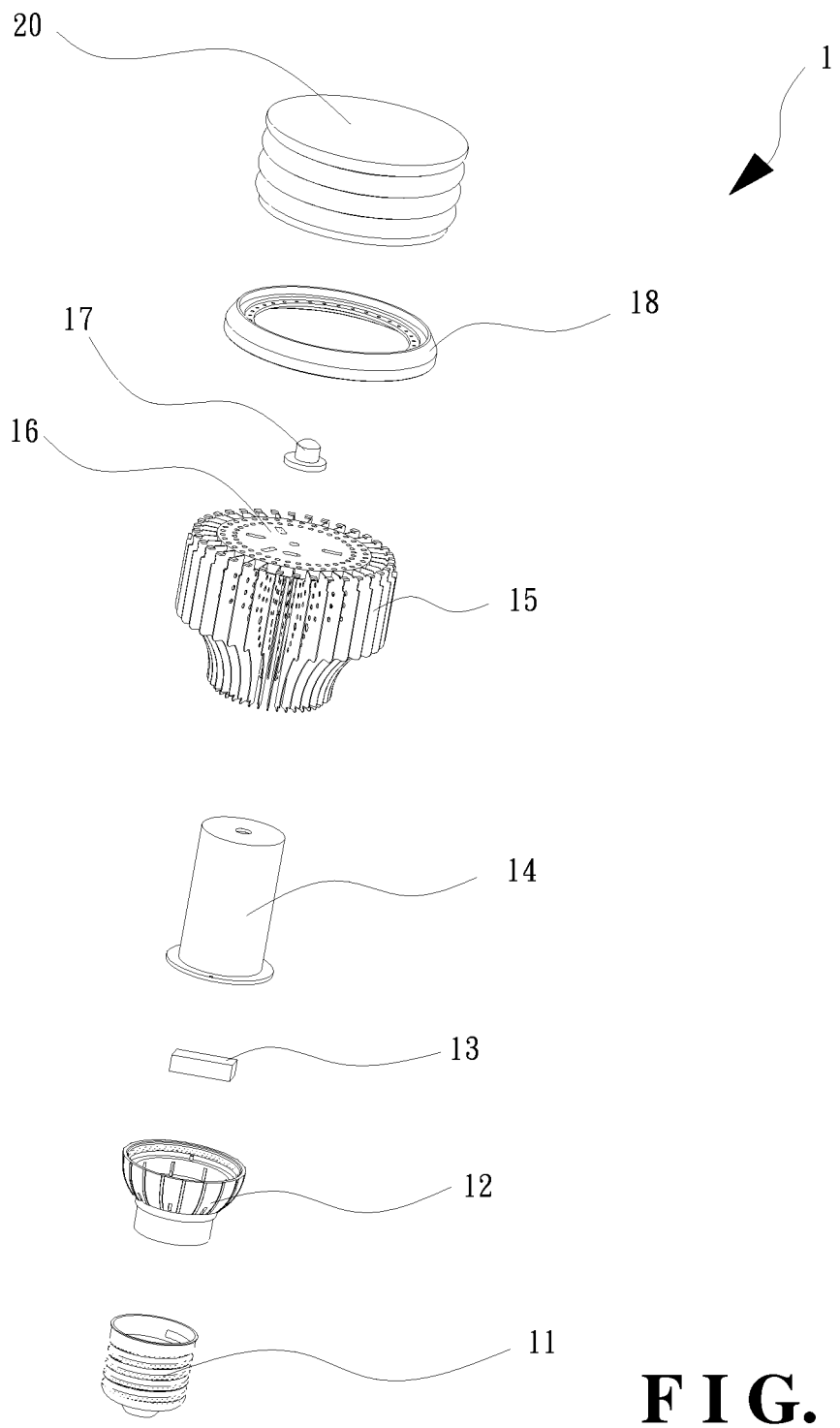
FIG. 1 is a exploded view of a preferred embodiment of the LED lamp including a preferred lampshade structure in accordance with the present invention.
Figure 2:
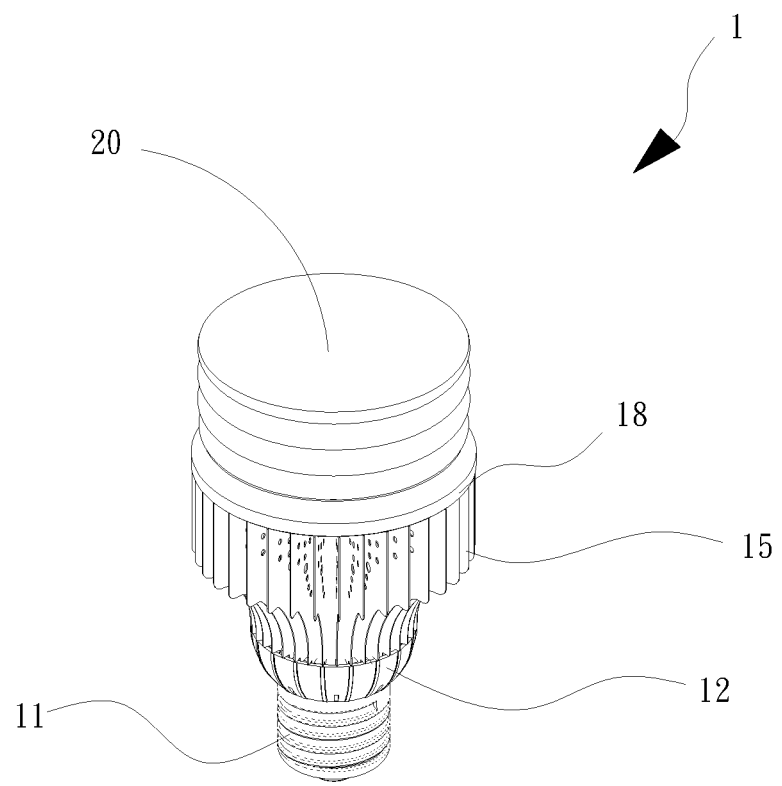
FIG. 2 is a perspective view of FIG. 1 in an assembly state.
Figure 3:
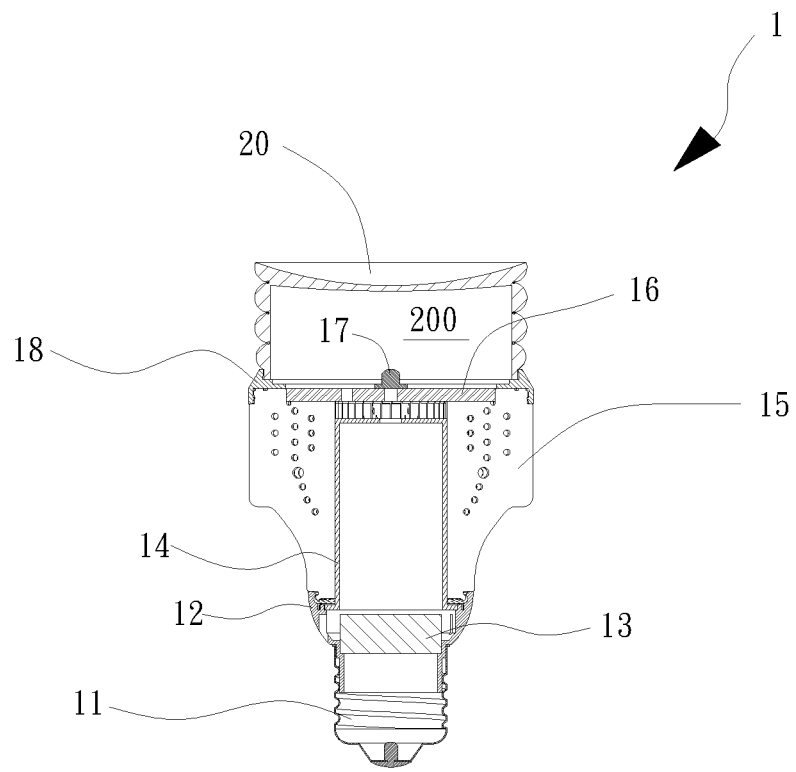
FIG. 3 is a cross-sectional view of FIG. 2 along a center line.

Please refer now to FIGS. 1, 2 and 3 for an exploded view, a perspective view in an assembled state, and a cross-sectional view along a center line of an LED lamp device 1 that incorporates a first embodiment of the lampshade structure 20 in accordance with the present invention, respectively.

As shown in the drawings, the LED lamp device 1 comprises a base 11, an installation bowl 12, a transformer (or say a power IC) 13, a hollow post 14, a heat-dissipation module 15, a circuit board 16, at least an LED 17 (one shown in the figures), a holder ring 18 and the lampshade 20.

The base 11 is formed as a screw head to further connect in a screwing manner with a foreign electric holder. The base 11 can be an E-series screw head having a thread fitting specs, for example, to E10, E12, E14, E26, E27, E40, and so on (wherein the number following the letter E stands for a diameter of the electrically conductive thread in millimeters), or an MR-series pin plug (not shown in the figures) spec, for example, to MR 11, MR16 and so on (wherein the number following the letter MR stands for a distance in millimeters between pins of the pin plug). Certainly, a base form other than the aforesaid E-series and MR-series can be also adapted to the LED lamp device 1 by limited structural improvements, which is believed to be familiar to those skill persons in the art after understanding teaching in this disclosure.

The installation bowl 12 constructed on top of the base 11 is to accommodate the transformer 13 and to provide a crown for constructing there-on-top the foregoing hollow post 14 and the heat-dissipation module 15.

The transformer 13 is to perform as an electric bridge between an exterior power source introduced through the base 11 and the interior operational power to be used for lighting the LED/LEDs 17.

The hollow post 14 is formed in a thin-wall cylinder having an upper end to sustain the circuit board 16, an opposing lower end to sit in the installation bowl 12, and a through hole for a predetermined wiring arrangement between the circuit board 16 and the transformer 13. The hollow post 14 can be made of a metal, a plastic, or any appropriate material.

The heat-dissipation module 15 composed by a plurality of cooling fins arranged orderly in a radial pattern with predetermined angular spacing is to sit at the installation bowl 12, to sleeve through the hollow post 14, and to hold on top the circuit board 16. Each of the cooling fins has a plurality of small through holes (not numbered in figures) formed thereon for helping ventilation as well as the heat-dissipation. For the technique for forming the flower-type heat dissipation module applied in this preferred embodiment is well known in the art, details toward the manufacturing, materialing, and the assembling are omitted herein.

The circuit board 16 nested inside a step-like cavity formed centrally on top of the heat-dissipation module 15 by the cooling fins is to mount electrically and structurally a plurality of LEDs 17 (one shown in the figures). The heat generated mostly by operating the LEDs 17 during illumination is conducted by the circuit board 16 to the cooling fins of the heat-dissipation module 15 and then dissipated into the ambient. A substrate for building the circuit board 16 can be made of ceramic materials, plastic materials, metal materials, or any proper material.

The LED (or LEDs) 17 arranged on the circuit board 16 is to provide a point light source for the lamp device 1, and is powered by the external electricity flowing through the base 11, the transformer 13 and the circuit board 16.

The holder ring 18 is located on top of the heat-dissipation module 15 and is configured at the lower rim thereof to provide a ring of spacer structure (having a plurality of downward teeth) for firmly encircling an outer periphery of the heat-dissipation module 15 by ensuring each spacing between any two adjacent cooling fins. At the upper rim of the holder ring 18, an inward step structure to form an interior cavity space for mounting the lampshade 20.

Figure 4:
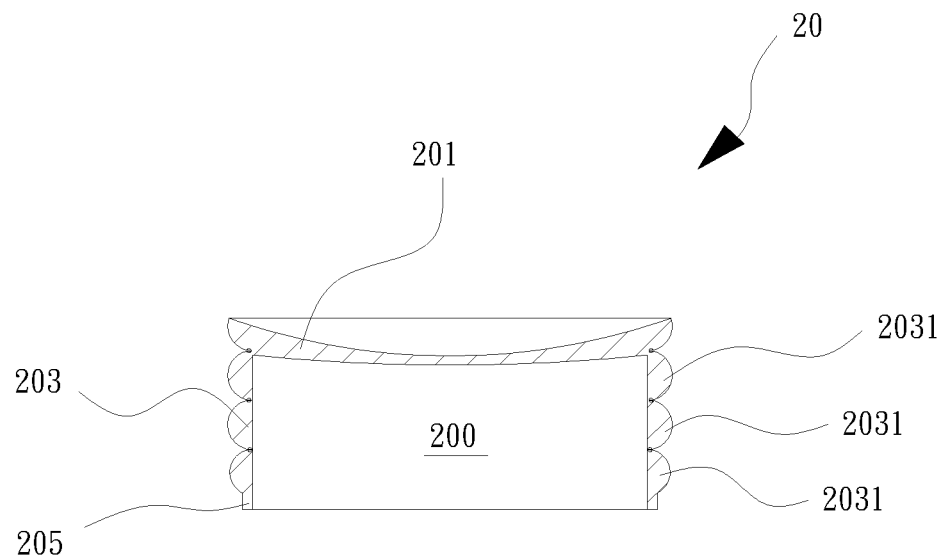
FIG. 4 is an enlarged view of the lampshade structure of FIG. 3, the first embodiment of the lampshade structure.

As shown in FIGS. 1-3 and referring further to FIG. 4, the lampshade 20, as a first embodiment according to the present invention, is received at a lower end by the interior cavity space of the holder ring 18. The lampshade 20 is formed as a cylindrical dome structure having a lower end 205 open to accommodate the LEDs 17 of the lamp device 1 in an interior space 200, a top portion thereof sealed and configured as a light-diffusing bowl or concave wall structure 201, and a sidewall 203 connecting the light-diffusing bowl structure 201 and the lower end. Further, the sidewall 203 has a surface structure formed as a plurality of piling rings 2031, each of which has a semi-circle cross section.

In the present invention, the light-diffusing bowl structure 201 of the lampshade 20 is the major contribution of this work. With the light-diffusing bowl structure 201 built to the lampshade 20, the lamp device 1 having at least an LED 17 can be transformed into an illumination device similar to a conventional light bulb device that provides omni-directional illumination.

Figure 5:
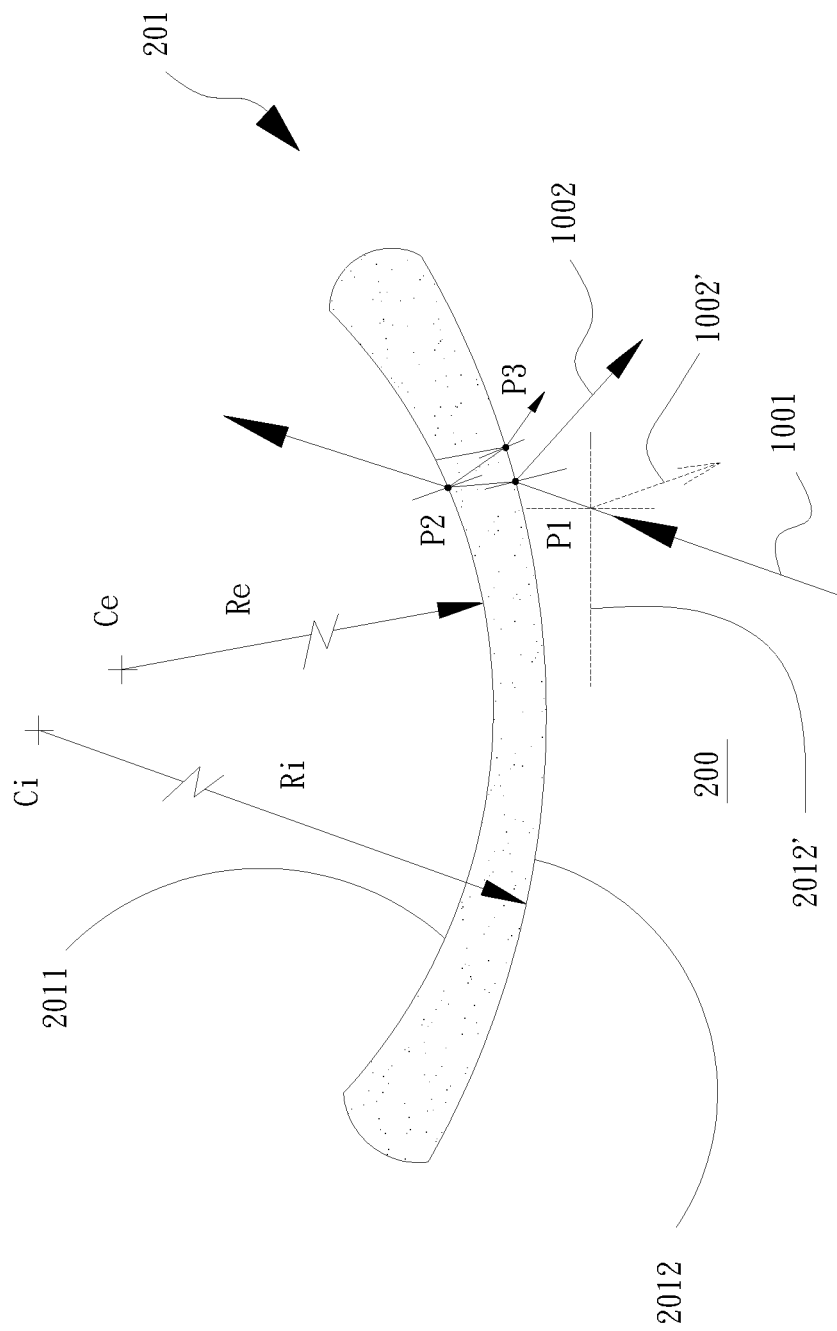
FIG. 5 is a schematic cross-sectional view of the concave piece of the lampshade structure in accordance with the present invention, which is targeted to explain the design concept of the lampshade structure for LED lamps.

Referring now to FIG. 5, a schematic cross-sectional view of a portion of the light-diffusing bowl structure 201 of the lampshade 20 in accordance with the present invention is shown for purposely explaining the design concept of the lampshade structure for LED lamps in this disclosure. The light-diffusing bowl structure 201 in accordance with the present invention is made of a light-permissible material and includes an exterior curve wall 2011 and an interior curve wall 2012. Preferably, the exterior curve wall 2011 has a curvature radius Re and a curvature center Ce, the interior curve wall 2012 has a curvature radius Ri and a curvature center Ci, and the curvature centers Ce and Ci for the exterior curve wall 2011 and the interior curve wall 2012 are both located exteriorly to the lampshade 20, i.e. at the opposing side of the interior space 200.

In the present invention, the merits from introducing the concave curve walls 2011 and 2012 can be easily seen through comparing the reflected rays 1002 and 1002' (from the same incident ray 1001), respectively corresponding to the real reflection surface 2012 (the interior curve wall) and the image reflection surface 2012' (a flat surface). As shown, the reflected ray 1002 is "flatter" than the image reflected ray 1002'. That is to say that, with the light-diffusing bowl structure 201 of the present invention, the reflected rays with respect to the incident rays from an LED (a point light source with a limited illumination angle) can be easily driven to the lateral side of the LED lamp device, such that the omni-directional illumination from the LED lamp device can be much easily accomplished. It is true to the physical structuring of the light-diffusing bowl structure 201 of the present invention.

Preferably but not necessarily, Ri>Re, and both the curvature centers Re and Ri are dropped at the same point. Upon such an arrangement, for the exterior curve wall 2011 and the interior curve wall 2012 are both in a concave form, the reflected ray 1002 of the incident ray 1001 at P1 (the incident point at the interior curve wall 2012) emitted from the LED 17 located in the interior space 200 of the lampshade 20 can be reflected to a sideward direction. Similar stories happen significantly at least to the other two consecutive points P2 and P3 as shown in FIG. 5. (It is noted by theorems that the reflected ray does always exist during the light transmission at the interface separating two different media.)

According to the present invention, to enhance the light-diffusing ability of the light-diffusing bowl structure 201, the light-permissible for the lampshade 20 can be a light-diffusing material or a light-permissible material containing light-diffusing powder, for example a PC PMMA material, a PMMA powder-add-in material, a silicone powder-added-in material, and so on. With the light-diffusing material, any point in the light-diffusing bowl structure 201 can be a point light source to scatter the incident rays. Then, a homogeneous and omni-directional illumination can be better achieved by the lampshade 20 of the present invention.

Figure 6:
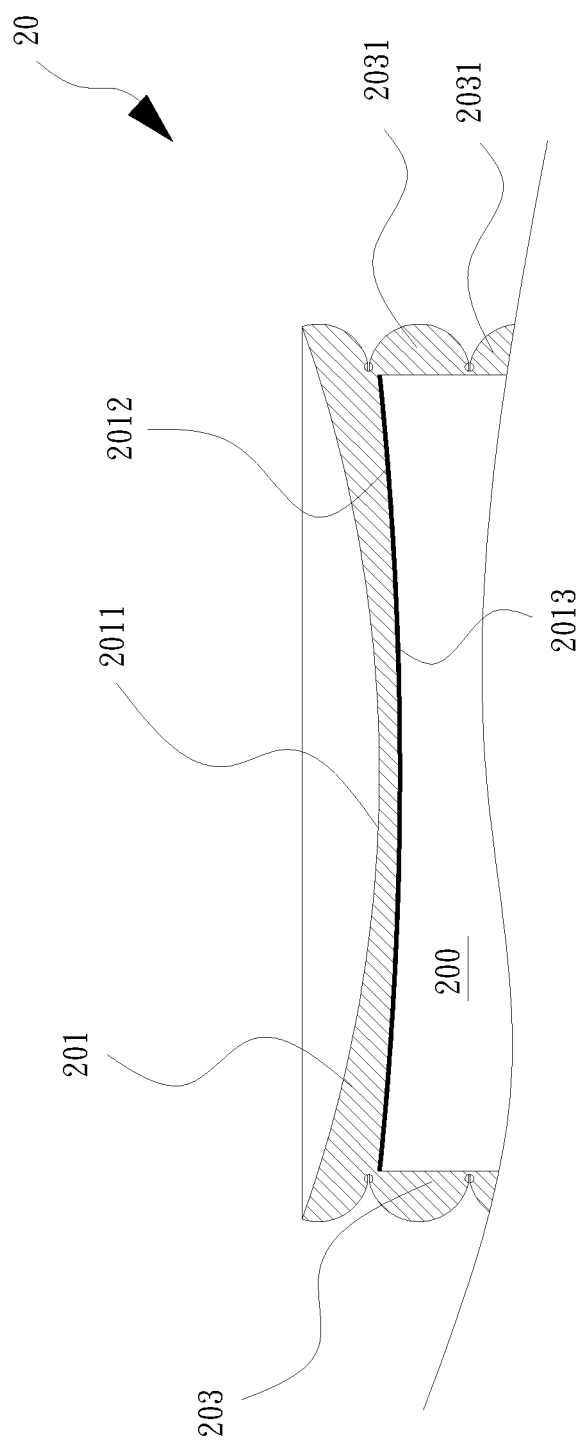
FIG. 6 is a schematic cross-sectional view of a second embodiment of the lampshade structure in accordance with the present invention.
Figure 7:
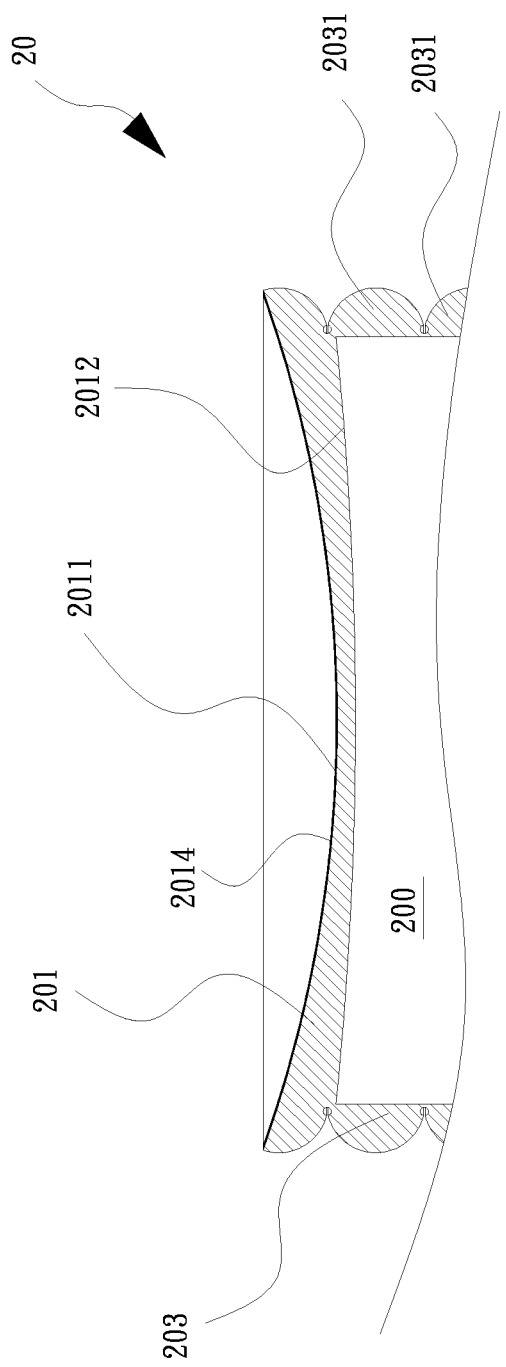
FIG. 7 is a schematic cross-sectional view of a third embodiment of the lampshade structure in accordance with the present invention.

Alternatively, to achieve a better diffusing effect on the light-diffusing bowl structure 201, the interior wall 2012, the exterior wall 201, or both of above can be painted or coated with a light-diffusing membrane 2013 and 2014 as shown in FIG. 6 and FIG. 7. The coating material can also be a light-diffusing material, for example a PC PMMA material, a PMMA powder-add-in material, a silicone powder-add-in material, and so on.

In FIG. 6, a second embodiment of the lampshade 20 is shown. By comparing to the first embodiment of the lampshade 20 shown in FIG. 1 thru FIG. 4, this embodiment includes an interior light-diffusing membrane 2013 coated or adhered to the interior wall 2012 of the light-diffusing bowl structure 201 of the lampshade 20.

In FIG. 7, a third embodiment of the lampshade 20 is shown. By comparing to the first embodiment of the lampshade 20 shown in FIG. 1 thru FIG. 4, this embodiment includes an exterior light-diffusing membrane 2014 coated or adhered to the exterior wall 2011 of the light-diffusing bowl structure 201 of the lampshade 20.

In the art, it is well understood that, even the specific light-diffusing enhancing means is applied to the light-diffusing bowl structure 201, the physical relation described in FIG. 5 still prevails and the direction of the reflected ray as shown plays the major direction for the diffusing rays at a specific point where the diffusing rays may scatter to various directions.

Figure 8:
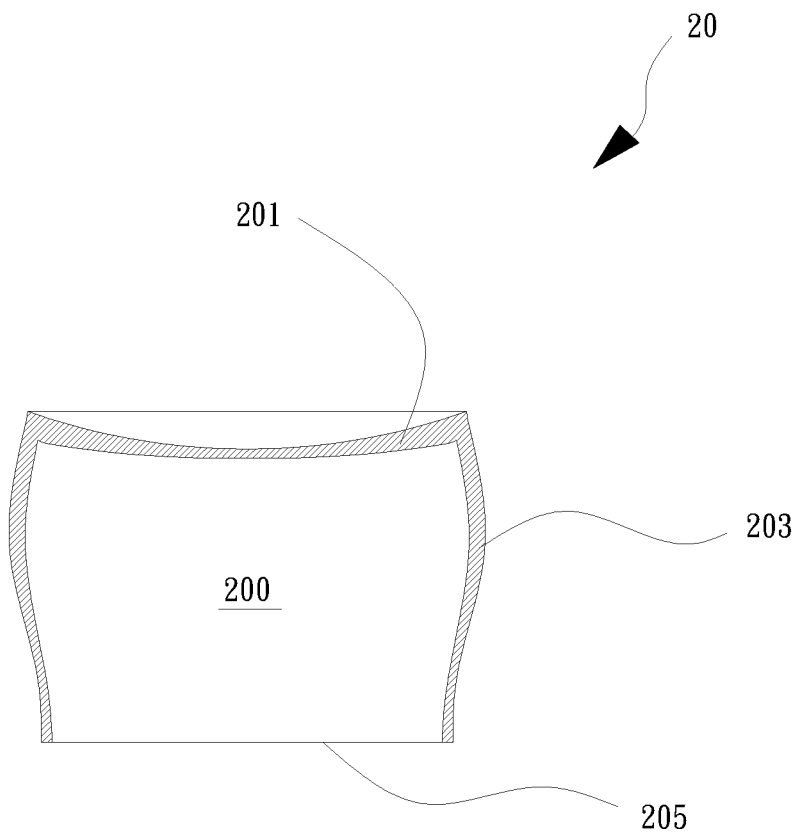
FIG. 8 is a schematic cross-sectional view of a fourth embodiment of the lampshade structure in accordance with the present invention.

Referring now to FIG. 8, a fourth embodiment of the lampshade 20 in accordance with the present invention is shown in a cross-sectional view. Compared to the first embodiment shown in FIG. 4, the major difference in between is that this embodiment does not include specific surface structure 2031 to the sidewall 203. The sidewall 203 herein performs only simple lateral shielding to the LEDs and/or the circuit board in the interior space 200, and the single light-diffusing bowl structure 201 is located to the upright position of the lampshade 20 distant to the position where the LED locates (close to the lower end 205 of the lampshade 20). In the present invention, the light-diffusing bowl structure 201 is preferably arranged to properly cover or occupy the whole illumination angle of the LEDs on the circuit board, such that each ray leaving the LED can contribute to omni-directional illuminating effort of the present invention.

Figure 9:
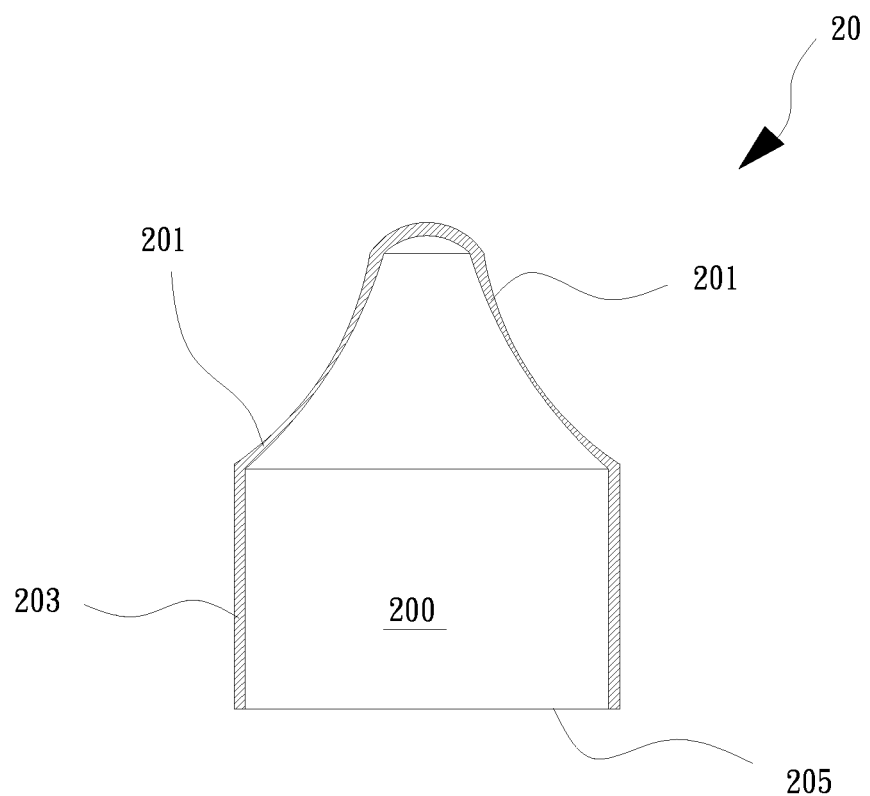
FIG. 9 is a schematic cross-sectional view of a fifth embodiment of the lampshade structure in accordance with the present invention.

Referring now to FIG. 9, a fifth embodiment of the lampshade 20 in accordance with the present invention is shown in a cross-sectional view. Compared to the first embodiment shown in FIG. 4, two major differences are seen in between. One difference is the removal of the surface structure 2031 on the sidewall 203 in this embodiment, and the other is that the light-diffusing bowl structure 201 in this embodiment is transformed into a cone shape on top end of the lampshade 20 but with a cross-section resembling to that shown in FIG. 4. Actually, in the present invention, the lampshade 20 is not limited to have a single light-diffusing bowl structure 201, but can include a plurality of relevant-sized light-diffusing bowl structures 201. One consideration of the number of the light-diffusing bowl structures 201 in the lampshade 20 may lie in the appearance evaluation of the LED lamp device.

Figure 10:
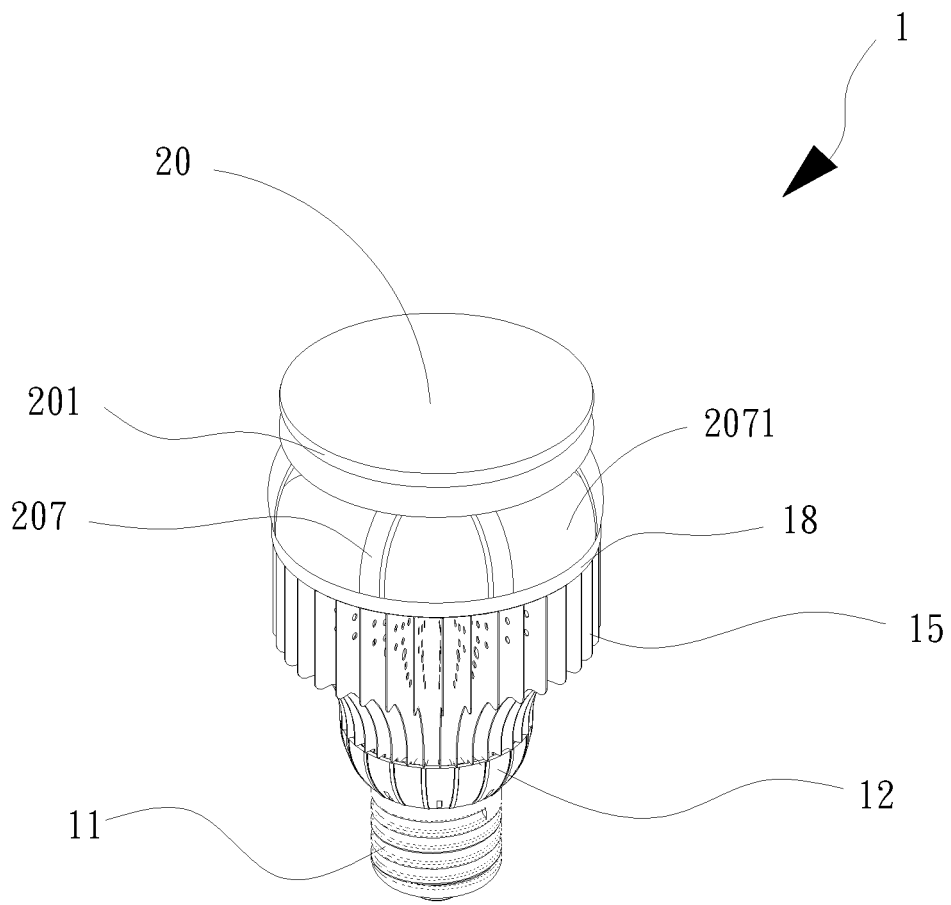
FIG. 10 is a schematic cross-sectional view of a sixth embodiment of the lampshade structure in accordance with the present invention.

Referring now to FIG. 10, a sixth embodiment of the lampshade 20 in accordance with the present invention is shown to be applied to a LED lamp device 1. Compared to the first embodiment shown in FIG. 2 and FIG. 3, one major difference is the continual sidewall 203 of the first embodiment is transformed into a frame structure 207 in this embodiment. The frame structure 207 can be variously formed to have empty therein for a better ventilation and heat-dissipation purpose.

In the present invention, by providing the light-diffusing bowl structures particularly made of a light-diffusing material to the LED lamp device, the conventional feature of the LED lamp device in directional illumination can be easily transformed into an omni-directional illumination feature to the LED lamp device, such that the conventional energy-consumed bulb apparatus can be replaced successfully and at a full scale.

While the present invention has been particularly shown and described with reference to a preferred embodiment, it will be understood by those skilled in the art that various changes in form and detail may be without departing from the spirit and scope of the present invention.

I claim:

1. A lampshade structure for LED lamps, comprising:
   at least one light-diffusing bowl structure located on top of the lampshade, each of the light-diffusing bowl structure further having thereof an exterior curve wall and an interior curve wall, the exterior curve wall having a curvature radius Re and a curvature center Ce, the interior curve wall having a curvature radius Ri and a curvature center Ci, both the Ce and the Ci being located exteriorly to the lampshade structure;
   a lower end, located oppositely to said at least one diffusing bowl structure;
   an interior space for accommodating at least one LED close to the lower end; and a sidewall, connecting said at least one light-diffusing bowl structure and the lower end in a manner of encircling the interior space;

wherein said sidewall further has a surface structure formed as a plurality of piling rings, each of the piling rings having a semi-circle cross section.

2. The lampshade structure for LED lamps according to claim 1, wherein said Ri is larger than said Re.

3. The lampshade structure for LED lamps according to claim 1, wherein said light-diffusing bowl structure is made of a light-diffusing material.

4. The lampshade structure for LED lamps according to claim 1, wherein said light-diffusing bowl structure is made of a light-permissible material containing light-diffusing powder.

5. The lampshade structure for LED lamps according to claim 4, wherein said light-diffusing powder is either a silicone powder or a PMMA powder.

6. The lampshade structure for LED lamps according to claim 1, wherein said interior curve wall is coated with a light-diffusing membrane.

7. The lampshade structure for LED lamps according to claim 1, wherein said exterior curve wall is coated with a light-diffusing membrane.

8. An LED lamp device, comprising:
a base for connecting with a foreign power source;
an installation bowl, constructed on top of the base;
a transformer, connected electrically with the base and mounted inside the installation bowl;
a hollow post, mounted on the installation bowl;
a heat-dissipation module, mounted on the installation bowl by accommodating the hollow post in a central portion thereof;
a circuit board, mounted in a central top portion of the heat-dissipation module and on top of the hollow post, being wired to the transformer through the hollow post;
at least an LED, mounted on the circuit board;
a holder ring, mounted on top of the heat-dissipation module; and
a lampshade, mounted on top of the heat-dissipation module by the holder ring, further comprising:
at least one light-diffusing bowl structure located on top thereof, each of the light-diffusing bowl structure further having thereof an exterior curve wall and an interior curve wall, the exterior curve wall having a curvature radius Re and a curvature center Ce, the interior curve wall having a curvature radius Ri and a curvature center Ci, both the Ce and the Ci being located exteriorly to the lampshade structure;
an open lower end, located within the holder ring and oppositely to said at least one diffusing bowl structure;
an interior space for accommodating said at least one LED thereinside; and
a sidewall, connecting said at least one light-diffusing bowl structure and the lower end in a manner of encircling the interior space;
wherein said sidewall further has a surface structure formed as a plurality of piling rings, each of the piling rings having a semi-circle cross section.

9. The LED lamp device according to claim 8, wherein said Ri is larger than said Re.

10. The LED lamp device according to claim 8, wherein said light-diffusing bowl structure is made of a light-diffusing material.

11. The LED lamp device according to claim 8, wherein said light-diffusing bowl structure is made of a light-permissible material containing light-diffusing powder.

12. The LED lamp device according to claim 11, wherein said light-diffusing powder is either a silicone powder or a PMMA powder.

13. The LED lamp device according to claim 8, wherein said interior curve wall is coated with a light-diffusing membrane.

14. The LED lamp device according to claim 8, wherein said exterior curve wall is coated with a light-diffusing membrane.

* * * * *